US008865117B2

(12) United States Patent
De Groot et al.

(10) Patent No.: US 8,865,117 B2
(45) Date of Patent: Oct. 21, 2014

(54) MEMBRANE REACTOR AND PROCESS FOR THE PRODUCTION OF A GASEOUS PRODUCT WITH SUCH REACTOR (75) Inventors: Arend De Groot, Alkmaar (NL); Yvonne Christine Van Delft, Petten (NL); Marija Saric, Haarlem (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 0 days.

(21) Appl. No.: 14/000,042

(22) PCT Filed: Feb. 17, 2012

(86) PCT No.: PCT/NL2012/050088
§ 371 (c)(1),
(2), (4) Date: Aug. 16, 2013

(87) PCT Pub. No.: WO2012/112046
PCT Pub. Date: Aug. 23, 2012

(65) Prior Publication Data
US 2013/0323162 A1 Dec. 5, 2013

(30) Foreign Application Priority Data

Feb. 18, 2011 (NL) ...................................... 2006245

(51) Int. Cl.
*C01B 21/00* (2006.01)
*B01J 7/00* (2006.01)
*B01J 19/00* (2006.01)
*B01J 19/24* (2006.01)
*B01J 8/00* (2006.01)
*C01B 3/38* (2006.01)
*B01J 8/04* (2006.01)
*C01B 3/16* (2006.01)

(52) U.S. Cl.
CPC B01J 7/00 (2013.01); B01J 19/006 (2013.01); *C01B 2203/041* (2013.01); *C01B 2203/0238* (2013.01); B01J 19/2475 (2013.01); *C01B 2203/0261* (2013.01); *B01J 2208/025* (2013.01); B01J 8/009 (2013.01); *C01B 2203/0233* (2013.01); C01B 3/38 (2013.01); *C01B 2203/0283* (2013.01); *C01B 2203/1047* (2013.01); *C01B 2203/1058* (2013.01); *B01J 2208/00504* (2013.01); B01J 8/0465 (2013.01); B01J 19/2485 (2013.01); *B01J 2208/0053* (2013.01); C01B 3/16 (2013.01)
USPC ................................ 423/651; 48/61; 422/163

(58) Field of Classification Search
None
See application file for complete search history.

(56) References Cited

U.S. PATENT DOCUMENTS 5,217,506 A 6/1993 Edlund et al.
5,259,870 A 11/1993 Edlund (Continued)

FOREIGN PATENT DOCUMENTS

EP 0 945 174 A1 9/1999
WO WO-2004/022480 A2 3/2004

(Continued)

OTHER PUBLICATIONS

Gallucci et al., "Theoretical Comparison of Packed Bed and Fluidized Bed Membrane Reactors for Methane Reforming," Intl. Journal of Hydrogen Energy, vol. 35, 2010, pp. 7142-7150.

(Continued)

*Primary Examiner* — Melvin C Mayes
*Assistant Examiner* — Kenneth Vaden
(74) *Attorney, Agent, or Firm* — Gilberto M. Villacorta; Sunit Talapatra; Foley & Lardner LLP (57) ABSTRACT The invention provides an integrated catalyst and membrane reactor for the production a predetermined gas such as hydrogen. The reactor comprises a gas flow channel, comprising a plurality of alternating catalyst sections and membrane sections, wherein each catalyst section comprises a catalyst bed and each membrane section comprises a plurality of membranes, and wherein the membranes are selectively permeable for the predetermined gaseous species.

24 Claims, 7 Drawing Sheets

(56) References Cited

U.S. PATENT DOCUMENTS

| | | | |
|---|---|---|---|
| 5,451,386 | A | 9/1995 | Collins et al. |
| 5,938,800 | A | 8/1999 | Verrill et al. |
| 5,958,091 | A | 9/1999 | Sakai et al. |
| 6,152,987 | A | 11/2000 | Ma et al. |
| 6,180,081 | B1 * | 1/2001 | Poschmann et al. ....... 423/648.1 |
| 2003/0215374 | A1 | 11/2003 | Wheeldon et al. |
| 2006/0248800 | A1 | 11/2006 | Miglin et al. |

FOREIGN PATENT DOCUMENTS

| | | |
|---|---|---|
| WO | WO-2009/150678 A1 | 12/2009 |
| WO | WO-2010/086635 A1 | 8/2010 |

OTHER PUBLICATIONS

International Search Report mailed May 15, 2012 in International Application No. PCT/NL2012/050088.

* cited by examiner

MEMBRANE REACTOR AND PROCESS FOR THE PRODUCTION OF A GASEOUS PRODUCT WITH SUCH REACTOR

CROSS-REFERENCE TO RELATED APPLICATION(S)

This application is the National Phase of International Patent Application No. PCT/NL2012/050088, filed Feb. 17, 2012, published as WO 2012/112046, which claims priority to Netherlands Application No. 2006245, filed Feb. 18, 2011. The contents of these applications are herein incorporated by reference in their entirety.

FIELD OF THE INVENTION

The invention relates to a membrane reactor and to a process for the production of $H_2$ with such reactor.

BACKGROUND OF THE INVENTION

Membrane reactors are known in the art. For example, WO2010/086635 discloses a reactor wherein a synthesis gas is subjected to a water-gas shift reaction, and carbon dioxide is separated from the shifted gas mixture by a $CO_2$-selective membrane, thereby generating a hydrogen-enriched gas mixture.

WO2004/022480 describes a process and apparatus for the production of high purity hydrogen by steam reforming. The apparatus is an integrated reactor for steam reforming of a hydrocarbon to produce $H_2$ and $CO_2$, with minimal CO in the $H_2$ stream. The reactor contains multiple flameless distributed combustion (FDC) chambers and multiple hydrogen-selective, hydrogen-permeable, membrane tubes. The feed and reaction gases flow through the reactor radially or axially. This document also describes different configurations of baffles which may be employed in the multi-tubular, FDC heated, axial flow, membrane steam reforming reactors to increase contact of the reactant gases with the catalyst in the catalyst beds. The baffle configuration comprises a washer shaped baffle and a disk shaped baffle arranged in and alternating pattern. This baffle arrangement causes the feed and reactant gases to flow through the hole in the washer shaped baffle and be deflected by disk shaped baffle thereby enhancing the contact of the reactant gases with the catalyst which is packed in the area between the baffles. Another baffle arrangement comprises truncated disks which are placed in and alternating pattern (truncated left and truncated right) in the reactor thereby causing the feed and reactant gases to "zigzag" as they flow through the catalyst which is packed in the area between the baffles. The baffles will have openings to allow the FDC tubes and membrane tubes to pass through them. Screens positioned in vertical alignment may also be used to support the baffles and in some cases hold the catalyst away from the shell wall or from the centre of the shell for better gas flow distribution.

In prior art membrane reactor designs, such as described in WO2004/022480, the catalyst and membrane are fully integrated. That is to say, that the catalyst may be a packed bed surrounding the membranes or that the catalyst is coated on the membrane.

In such prior art membrane reactor designs, the catalyst is distributed more or less evenly along the membrane, and the flow length of the feed through the catalyst bed is of the same order as the membrane length. In the case of an endothermic reaction, heat required for the reaction is provided, for example, through burners or heat exchanging elements arranged as repetitive elements with the membranes. On the other hand in the case of exothermic reaction, heat formed may be removed though heat exchanging elements. Consequently the catalyst volume, the heat exchanging area and membrane area cannot be selected independently in the design. Given the inherently low flux of the reaction or side product to be removed, for example hydrogen, through a given membrane area, compared to the rate in which it can be produced in a certain catalyst volume, and the heat flux required to enable the reaction to produce the reaction product, in prior art membrane reactor designs there is a mismatch between the catalyst volume, heat transfer area and membrane area.

An option to decouple the catalyst volume and the membrane area is to carry out separation and reaction process sequentially (alternating reaction and separation).

WO2009/150678 uses separate vessels containing membranes for separation and vessels containing the catalyst for reaction sequentially (membrane-catalyst-membrane-catalyst-membrane-catalyst, etc), whereby reactor and separation units and catalyst can be sized independently. However, from a practical point of view this is suitable only for a process in which a limited number of steps is necessary. Calculations (see examples) for steam reforming have shown that a limited number of sequential steps, for example 5 or less, the conversion of feed which can be achieved, and thus the economic attractiveness, is limited. Further, it will require a large amount of piping and control systems to connect the vessels in series.

Because membrane reactor processes operate at high pressures and temperatures, the containment, i.e. the pressure vessel which contains the membrane/catalyst assemblies, may become very costly. The most important reason seems that the flow rate through the membranes (flux) is low. The current invention allows a close packing of the membranes, a more compact art of designing the reactor.

In addition, mass transfer is an issue in packed membrane reactors. It is known (F. Gallucci et al. (2010), Theoretical comparison of packed bed and fluidized bed membrane reactors for methane reforming, *International J. Hydrogen Energy* 35/13, pp. 7142-7150) that mass transfer adversely influences the performance of membrane reactors, for example in the tube-in-tube concept (such as described in WO2004/022480). Because the concepts described such as the tube-in-tube concept lack the degree of freedom to choose the velocities independently, the mass transfer cannot be enhanced by increasing the gas velocities.

Hence, disadvantages of the prior art are the complicated solutions, the non-compact solutions, and the sub-optimal use of catalyst (more catalyst seems to be used than necessary).

SUMMARY OF THE INVENTION

Hence, it is an aspect of the invention to provide an alternative reactor and an alternative process, which obviate one or more of the above drawbacks.

The invention provides a way of integrating membranes, catalysts and heat exchange area/burner in a single vessel in such a way that the membranes can be spaced for maximum compactness of the whole assembly.

In a membrane reactor membranes are used to remove one of the reaction products (e.g. hydrogen) in order to shift the equilibrium of the reaction. In the invention the required integration of separation and reaction is achieved by passing the feed gas (e.g. steam and natural gas) sequentially through a catalyst bed and along a plurality (such as a bundle of closely packed) membranes. Baffles may be used to guide the gas through the required number of sequential steps of reaction and separation and create a sequence of passages. In addition, it is proposed to use a structured catalyst to reduce the pressure losses in the reactor. This is preferred in this membrane reactor configuration because the velocities will be higher than in traditional designs.

The invention provides, for the first time, a reactor design wherein the flow is in cross flow, especially with a (compact) membrane tube bundle and wherein the flow passes through a catalyst bed and along a plurality of membranes (such as a membrane bundle) alternatingly (membrane→catalyst→membrane→catalyst→etc). Hence, herein the term "alternating" indicates that the membrane sections and catalyst sections alternate each other, and that in such a way the sections are arranged within the reactor. Thus, the cross flow configuration of the invention implies that the membrane tubes extend from one membrane section to the next membrane section, as is further explained below, with reference to the figures. This is accomplished according the invention in a compact manner, which avoids the long distances that would be required for existing membrane reactor designs to enable heat transfer and provide catalyst volume.

Hence, a first advantage of the proposed membrane configuration is that it allows a much more compact construction of the membrane reactor.

The second issue the invention addresses are the low velocities of gases in the standard membrane reactor designs. An advantage of the proposed system is that it allows choosing the velocity of the feed gases independently from the rate of extraction of one of the reaction products through the membrane by designing or sizing the baffle system to enhance mass and heat transfer in and from the catalyst bed and between the membrane surface and the catalyst.

The third issue is that a different reaction temperature from the membrane operating temperature can be thermodynamically advantageous (i.e. to achieve high conversion) and the membranes can have an optimum operating temperature. In the example of the steam reforming reaction, the membrane preferably should operate at a lower temperature to increase the lifetime. The invention allows using relatively low temperatures, while being highly efficient and compact.

Hence, in a first aspect, the invention provides an integrated catalyst and membrane reactor ("reactor") comprising a gas flow channel, wherein the gas flow channel comprises a plurality of alternating catalyst sections and membrane sections, wherein each catalyst section comprises a catalyst bed, wherein each membrane section comprises a plurality of membranes, such as tubular membranes, wherein the membranes are preferably configured in a cross-flow arrangement relative to a gas flow (of a feed gas) through the gas flow channel, and wherein the membranes are selectively permeable for a predetermined gaseous species (herein also indicated as "predetermined gas"). These membranes may have a tubular symmetry. Further, the (tubular) membranes may be configured in a cross-flow arrangement relative to the gas flow channel.

Thus the invention provides an integrated catalyst and membrane reactor comprising a gas flow channel having a plurality of alternating catalyst sections and membrane sections, wherein each catalyst section comprises a catalyst bed and each membrane section comprises a plurality of selectively permeable membranes which extend through the plurality of membranes. Preferably, the membrane sections are stacked, allowing the (tubular) membranes to directly extend through the successive membrane sections without lost space. In a preferred embodiment, both the membrane sections and the catalyst sections are stacked. In such a stacked configuration, the feed gas flow zigzags through the catalyst sections and membranes section in an alternating mode.

In a further aspect, the invention provides a method for the production of a predetermined gaseous species, in an embodiment hydrogen gas, comprising (i) flowing a feed gas (including one or more starting components) suitable for the catalytic formation of the predetermined gaseous species through a plurality of alternatingly arranged catalyst sections and membrane sections (within a single reactor), wherein each catalyst section comprises a catalyst bed (suitable for converting the feed gas to the predetermined gaseous species and optionally other (gaseous) species), wherein each membrane section comprises a plurality of gas membranes, such as tubular gas membranes, which are selectively permeable for the predetermined gaseous species. The predetermined gaseous species is then carried off at the permeate side of the membranes (especially at the inside of tubular membranes), which extend through the successive membrane sections. The membranes, especially tubular gas membranes, are preferably configured in a cross-flow arrangement relative to a gas flow through the gas flow channel, and the method preferably applies the reactor according to the invention.

In particular, the method of the invention comprises feeding a feed gas containing one or more components capable of being catalytically converted to hydrogen, through a plurality of catalyst sections and membrane sections alternatingly arranged in a reactor, wherein the membrane sections comprise a plurality of (tubular) membranes which are selectively permeable for hydrogen. The catalyst section comprises a catalyst which is capable of converting the relevant components of the feed gas to hydrogen. The alternating arrangement is preferably constituted by stacked catalyst sections and stacked membrane sections, through which the feed gas flows in turns.

Such method may include (ii) converting at least part of the feed gas into the predetermined gaseous species (in the catalyst sections(s)), especially hydrogen, and (iii) obtaining the predetermined gaseous species from the (tubular) membranes (i.e. from the permeate side of the (tubular) membranes). Hence, especially a reactor may be applied wherein the alternatingly arranged catalyst sections and membrane sections are integrated. The phrase "within a single reactor" does not exclude that the method may be performed parallel in a plurality of reactors (such as described herein). The term "within a single reactor" especially refers to the integrated catalyst and membrane reactor as described herein.

In an alternative aspect of the method at least part of the feed is converted to the predetermined gaseous species and a second reaction product, and the predetermined gaseous species, especially hydrogen, is obtained from the membranes (i.e. from the permeate side of the membranes), and the (desired) second product is obtained in high concentration from the feed gas by removing the predetermined gaseous species from the permeate side of the membrane. This may for instance be the case when performing dehydrogenation.

Hereby, compactness may be obtained and heat transfer limitations (by increasing velocities to "engineering values") may be overcome. It may further allow enabling catalyst and membrane to operate at different conditions (operating window). For instance, for the steam reforming reaction, even at temperatures below 750° C., such as even below 700° C., like at 680° C. or lower, a very high methane conversion can be achieved, which in sequential processes (in sequential reactors with reaction-separation-reaction-separation- . . . etc.) can only be achieved at higher temperatures and after a large number of steps.

Herein, the term "integrated catalyst and membrane reactor" relates to a reactor comprising membranes and catalyst in one single reactor (vessel). However, the method of the invention may also include (the application of) a plurality of such reactors, either arranged parallel or arranged in series.

A specific beneficial geometry of the "membrane(s)" mentioned herein is (a) tubular membrane(s). In a further specific embodiment, the, preferably tubular, membranes are arranged in a cross-flow arrangement in the gas flow channel, i.e. the feed gas flows along the (tubular) membranes; the permeate side is within the tubular membranes. Thus, the cross-flow arrangement implies that the direction of the gas flow through the membrane section, i.e. from one catalyst section to the next catalyst section, is substantially perpendicular to the gas flow inside the tubular membranes (the permeate). Hence, while flowing through the gas flow channel, one or more reaction products (including the predetermined gaseous species) are formed in the catalyst sections and one or more components of the gas mixture in the gas flow channel pass the membrane (i.e. in an embodiment the predetermined gaseous species) and leave the reactor via the permeate side of the membranes, whereas one or more other components of the gas in the gas flow channel do not pass the selective membrane and stay at the retentate side (and leave the reactor via an exhaust). The (tubular) membranes are herein especially arranged perpendicular to the flow (during operation of the reactor) through the gas flow channel (and to the flow through the membrane section).

Due to the sequential process, feed gas is converted to at least the predetermined gaseous species in a plurality of catalyst sections and the gas in the gas flow channel is depleted in one or more of the starting components of the feed gas. In this way, one or more starting components of the feed gas may be depleted and within the gas flow channel, the feed gas may be enriched with one or more reaction products (including the predetermined gaseous species). However, due to the presence of the membranes, one or more of those reaction products (i.e. the predetermined gaseous species) may be separated from the gas flow. Such separation enhances the process of formation of the one or more reaction products, such as hydrogen (as the predetermined gaseous species). In comparison to the chemical equilibrium situation, the presence of the cross-flow membranes thus reduces the partial pressure of the predetermined gaseous species in the gas in the gas flow channel.

It appears that when the feed gas alternatingly flows through the catalyst sections and membrane sections, a process with sequential reactors is mimicked but with better results. The present reactor can be more efficient and much smaller. It especially appears that, for example for an industrial hydrogen production process, at least about 20 sections (such as 10 catalyst sections and 10 membrane sections, or 11 membrane sections and 9 catalyst sections, which are arranged in an alternating way in flow channel), a reaction efficiency of over 80% may be obtained. With about 30 sections even about or over 90%. Hence, in an embodiment, the gas flow channel comprises at least 10 catalyst sections (and thus 9-11 membrane sections). Especially, the gas flow channel comprises at least 12, even more preferably at least 15 catalyst sections (and thus 11-13 or 14-16 membrane sections, respectively).

The term "catalyst" may also refer to a plurality of catalysts. The catalyst in an embodiment especially refers to a catalyst suitable to generate the predetermined gaseous species (such as in an embodiment $H_2$) under suitable catalytic conditions from the feed gas. The catalyst may be present in catalyst beds (see also below).

In an embodiment, the catalyst is a water gas shift catalyst, a steam reforming catalyst, a dehydrogenation catalyst, a Fischer-Tropsch catalyst, a $CO_2$ reforming catalyst, or a partial oxidation catalyst. Especially, the catalyst may be a reforming catalyst, such as a steam reforming catalyst. As mentioned above, the term catalyst may also refer to a plurality of catalysts, such as a prereforming catalyst and a reforming catalyst. The use of a prereforming catalyst may allow lower temperatures at the reforming catalyst. This may contribute to the life time of the tubular membranes.

In yet another embodiment, the catalyst may be a catalyst suitable for dehydrogenation (of for instance cyclohexane or propane).

In a specific embodiment, the catalyst beds comprise a monolithic catalyst (see also below). Hence, each section may comprise such monolithic catalyst. As non-limiting examples, some possible reactions are indicated in table 1. As will be clear to the person skilled in the art, dependent upon the predetermined reaction to be performed in the reactor, the catalyst may be selected.

TABLE 1

Examples of possible processes

| Reaction | Reaction scheme |
|---|---|
| Steam reforming of natural gas | $CH_4 + H_2O \leftrightarrow 3H_2 + CO$ |
| Steam reforming of higher hydrocarbons | $C_nH_{2m} + nH_2O \leftrightarrow (m + n)H_2 + nCO$ |
| $CO_2$ reforming | $CH_4 + CO_2 \leftrightarrow 2H_2 + 2CO$ |
| Water-gas shift | $CO + H_2O \leftrightarrow H_2 + CO_2$ |
| Cyclohexane dehydrogenation | $C_6H_{12} \leftrightarrow C_6H_6 + 3H_2$ |
| Propane dehydrogenation | $C_3H_8 \leftrightarrow C_3H_6 + H_2$ |
| Partial oxidation | $CH_4 + \tfrac{1}{2} O_2 \leftrightarrow 2H_2 + CO$ |
| | $CH_4 + 1\tfrac{1}{2} O_2 \leftrightarrow 2H_2O + CO$ |
| Fischer-Tropsch | $(2n + 1) H_2 + n\,CO \rightarrow C_nH_{(2n+2)} + n\,H_2O$ |

The term "gas flow channel" herein refers to a channel through which a (feed) gas may flow. Herein, the gas flow channel comprises a plurality of (alternatingly arranged) sections, through which the (feed) gas will flow. Hence, gas may only flow from a catalyst section to a downstream catalyst section through an intermediate membrane section. Likewise, gas may only flow from a membrane section (MS) to a downstream membrane section through an intermediate catalyst section (CS). Hence, the arrangement of sections is $MS_k$-CS-(MS-CS)$_n$ or $CS_k$-MS-(CS-MS), wherein n will in general be at least 1 and k may be 0 or 1. For instance, when k=0 and n=2, the sequence of sections is, and using $MS_k$-CS-(MS-CS)$_n$: catalyst section, membrane section, catalyst section, membrane section, catalyst section, respectively. With for instance k=1 and n=1, and using $CS_k$-MS-(CS-MS)$_n$, the sequence of sections is: catalyst section, membrane section, catalyst section, membrane section, respectively. In both examples, the gas flow channel comprises two catalyst sections. As indicated above, k may be 0 or 1 and n is preferably at least 10.

The terms "upstream" and "downstream" relate to an arrangement of items or features relative to the propagation of the gas from a gas source or inlet of such gas into the reactor, wherein relative to a first position within the gas flow, a second position in the gas flow closer to the gas source is "upstream", and a third position within the gas flow further away from the gas source is "downstream".

As indicated above, the term "catalyst bed" especially refers to an arrangement of a catalyst, for instance as catalyst particles or as monolith. In the former case, the catalyst particles may for instance be a particulate support promoted with catalyst material (in general a metal or metal oxide). In the latter case, this may be a specific structure, promoted with catalyst material. The feed gas may flow through the voids between the particles or the through the channels in the monolith. Especially, the monolith may be a ceramic or metal block consisting of a large number of (small) (straight and parallel) channels. Hence, in an embodiment, the monolith is a ceramic or metal foam, especially a metal foam (also in view of heat transfer).

In contrast to the prior art, preferably the catalyst and the membrane(s) may not be in contact with each other. This especially implies that there may be a non-zero distance between catalyst, more especially between the monolithic catalyst and the closest membranes. Hence, in a preferred embodiment, a majority of the membranes is not in physical contact with the catalyst beds. Preferably, none of the membranes is in physical contact with the catalyst beds. This may be achieved by choosing a solidly structured (e.g. freestanding or monolith) catalyst bed or by using permeable walls or meshed screens to contain the catalyst bed and keep it separated from the membranes.

In a further embodiment, at least 10% of the volume of the membrane sections is occupied by the plurality of membranes. The occupation may even be at least 15%, such as at least 20% of the volume, most preferably at least 30%, preferably however less than 50% of the volume. The rest of the volume is open and is used to allow the (feed) gas flow through to the next catalyst section (or to an exhaust). The relatively high volume taken by the plurality of tubular membranes, including their wall thickness and their enclosed permeate volume, allowed an increased compactness.

Especially, the membrane sections may comprise bundles of, preferably tubular, membranes (preferably in a cross-flow arrangement relative to the gas flow through the membrane sections). In this way, the membranes may efficiently occupy the volume(s) of the membrane section(s) and/or may relatively be easily arranged in the reactor. Voids between the bundles may facilitate flow of the gas within the membrane sections.

As indicated above, the reactor of the invention may especially be used for the generation of hydrogen. In such instance, the feed will be chosen to allow catalytic generation of hydrogen, the catalyst will be chosen to allow catalytic formation of hydrogen of the feed and the membranes will be chosen to allow selective separation of $H_2$ via the membrane from the exterior of the membrane to the permeate side. The exterior of the membrane is subjected to the cross-flow as indicated above. Hence, in a specific embodiment the membranes are selectively permeable for $H_2$ as the predetermined gaseous species. However, the reactor may for instance also be applied for a Fischer-Tropsch reaction.

The reactor may have all kind of configuration of the flow channel with alternating catalyst sections and membrane sections.

In a specific embodiment, the reactor comprises a heating channel. This heating channel may be used to provide heat to the reactor and especially to heat the catalyst ((beds) in the catalyst sections). In this way, the desired (predetermined) reaction can be performed. Hence, in an embodiment, the reactor further comprises a heating channel, wherein the heating channel is adjacent to the catalyst sections. In a further embodiment, the reactor comprises (also) a feed channel, upstream of the gas flow channel, wherein in an embodiment at least part of the feed channel is adjacent to the catalyst (sections).

Herein, the term adjacent may refer to "close by" (here for instance at a distance of up to about 20 mm) or in an embodiment in physical contact.

Especially, at least part of the heating channel is in physical contact with the catalyst sections. Especially, physical contact may improve heat transfer to the catalyst. Part of the heating channel, or the entire heating channel, may also be indicated as burner or burner section. In this heating channel, for instance methane may be burned to generate heat. To this end, for instance natural gas and air are fed to the heating channel and ignited.

In a further embodiment, at least part of the heating channel is adjacent to the feed channel. Especially, in an embodiment at least part of the heating channel is in physical contact with the feed channel. Especially, physical contact may improve heat transfer to the feed channel.

In a further embodiment, at least part of the feed channel is adjacent to the catalyst sections. Especially, in an embodiment at least part of the feed channel is in physical contact with the catalyst sections. Especially, physical contact may improve heat transfer to the catalyst.

In a specific embodiment, the catalyst comprises a reforming catalyst and at least part of the feed channel comprises a pre-reforming catalyst. The catalyst sections in the flow channel may then comprise a reforming catalyst. Alternatively or additionally, the catalyst sections in the flow channel may comprise both a pre-reforming catalyst and a reforming catalyst. Alternatively or additionally, one or more catalyst sections in the flow channel may comprise a pre-reforming catalyst and one or more (other) catalyst sections in the flow channel may comprise a reforming catalyst.

In a specific embodiment, the heating channel is in physical contact with the feed channel over at least part of the total length of the heating channel. This may for instance allow a tube-in-tube configuration. Hence, in a specific embodiment, the feed channel circumferentially surrounds the heating channel over at least part of the total length of the heating channel.

In a further specific embodiment, adjacent catalyst sections are separated by baffles within the gas flow channel and adjacent membrane sections are separated by baffles within the gas flow channel. Again, this may for instance allow a tube-in-tube arrangement, wherein the heating channel surrounded by the feed channel may be arranged in a central portion, and the flow channel may be arranged around the feed channel, with alternating catalyst sections and membrane sections, through which for instance the feed gas may meander (due to the presence of baffles, which may be configured to guide the feed gas in a meandering flow through at least part of the flow channel). Hence, in an embodiment, the catalyst sections and the membrane sections are arranged to allow a meandering flow through the catalyst sections and the membrane sections of the flow channel. The baffles may for instance have the form of disks. The disks may have openings or may be truncated disks. In this way, gas flow from one section to the other section (or within sections) may be facilitated.

In a specific embodiment, the catalyst sections and membrane sections are radially arranged around a central heating channel, with the catalyst sections arranged between the membrane sections and the heating channel. As indicated above, in an embodiment, the feed channel may be arranged between the catalyst sections and the central heating channel.

Such configurations as indicated above allow a separation of the catalyst and the membrane. Hence, the desired and optimum ratio of catalyst interface area (of the catalyst bed at the interface membrane section—catalyst section; i.e. the interface area) and total membrane area in said membrane section (defined as the sum of the areas of all membranes in the membrane section) may be chosen, whereas in prior art configurations those might necessarily be connected, since the catalyst was arranged on the membrane or the membrane was embedded in the catalyst. Hence, in a specific embodiment, the interface area of catalyst bed at the interface membrane section—catalyst section may be smaller than the surface area of the plurality of membranes comprised by said membrane section. Especially, the interface area of catalyst bed at the interface membrane section and catalyst section is at least between 2 and 3 times smaller than the surface area of the plurality of membranes comprised by said membrane section. In this way, the volume of the catalyst bed may be chosen independently from the membrane area. This may give more design freedom and may allow optimization of the process that may be conducted with the reactor.

Since in a preferred embodiment the length of the tubular membranes in a membrane section may be approximately the same as the height of the catalyst bed in the adjacent catalyst section, the above condition can also be rephrased as that in a plane perpendicular to the tubular membranes and parallel to the baffles, the accumulated perimeters of the tubular membranes in the membrane section is larger than the perimeter of the adjacent catalyst section, preferably at least 5 times larger.

In a specific embodiment, the plurality of tubular membranes penetrate through the plurality of membrane sections. For instance, the membrane sections may be stacked (for instance in an outer ring of the reactor), and the tubular membranes penetrate the stacked membrane sections. This may be an economic way to configure the tubular membranes and/or to collect the predetermined gas.

In a specific embodiment, the feed comprises a saturated hydrocarbon and one or more of $CO_2$, $H_2O$, and $O_2$. Such saturated hydrocarbon may especially be methane ($CH_4$). Hence, in an embodiment, the feed may comprise natural gas. $CO_2$ may be present in the feed for $CO_2$ reforming. $H_2O$ may be applied for steam reforming of methane and/or higher hydrocarbons. $O_2$ may be applied for partial oxidation of methane. Hence, in a specific embodiment, the feed comprises a saturated hydrocarbon, especially methane, and steam or $CO_2$, and the catalyst comprises a reforming catalyst.

In an alternative embodiment, the feed comprises CO and $H_2O$ for applying a water gas shift method.

The steam reforming catalyst can be any catalyst known as such in the art. Typically steam reforming catalysts which can be used include, but are not limited to, Group VIII transition metals, particularly nickel.

Membranes which are suitable for use in the apparatus and process of the present invention include, but are not limited to, (i) various metals, such as hydrogen permeable transition metals selected from Group IIIB, IVB, VB, VIIB and VIIIB of the periodic table and metal alloys or metal hydrides of such metals, (ii) molecular sieves, ceramics, zeolites, silica, alumina, refractory metal oxides, carbon, (iii) organic polymers, and mixtures thereof. Illustrative, but non-limiting, examples of hydrogen separating devices utilizing such membranes include the membranes described in U.S. Pat. No. 5,217,506, U.S. Pat. No. 5,259,870, and U.S. Pat. No. 5,451,386, and U.S. Pat. No. 6,152,987.

The term "substantially" herein will be understood by the person skilled in the art to include embodiments with "entirely", "completely", "all", etc. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. When enumerating several means, several of these means may be embodied by one and the same item of hardware. Where certain features are recited in different dependent claims, a combination of these features is also contemplated.

The invention further applies to an apparatus comprising one or more of the characterising features described in the description and/or shown in the attached drawings.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale. The invention will further especially be described with reference to tubular membranes and cross-flow arrangements.

DESCRIPTION OF PREFERRED EMBODIMENTS

Figure 1:
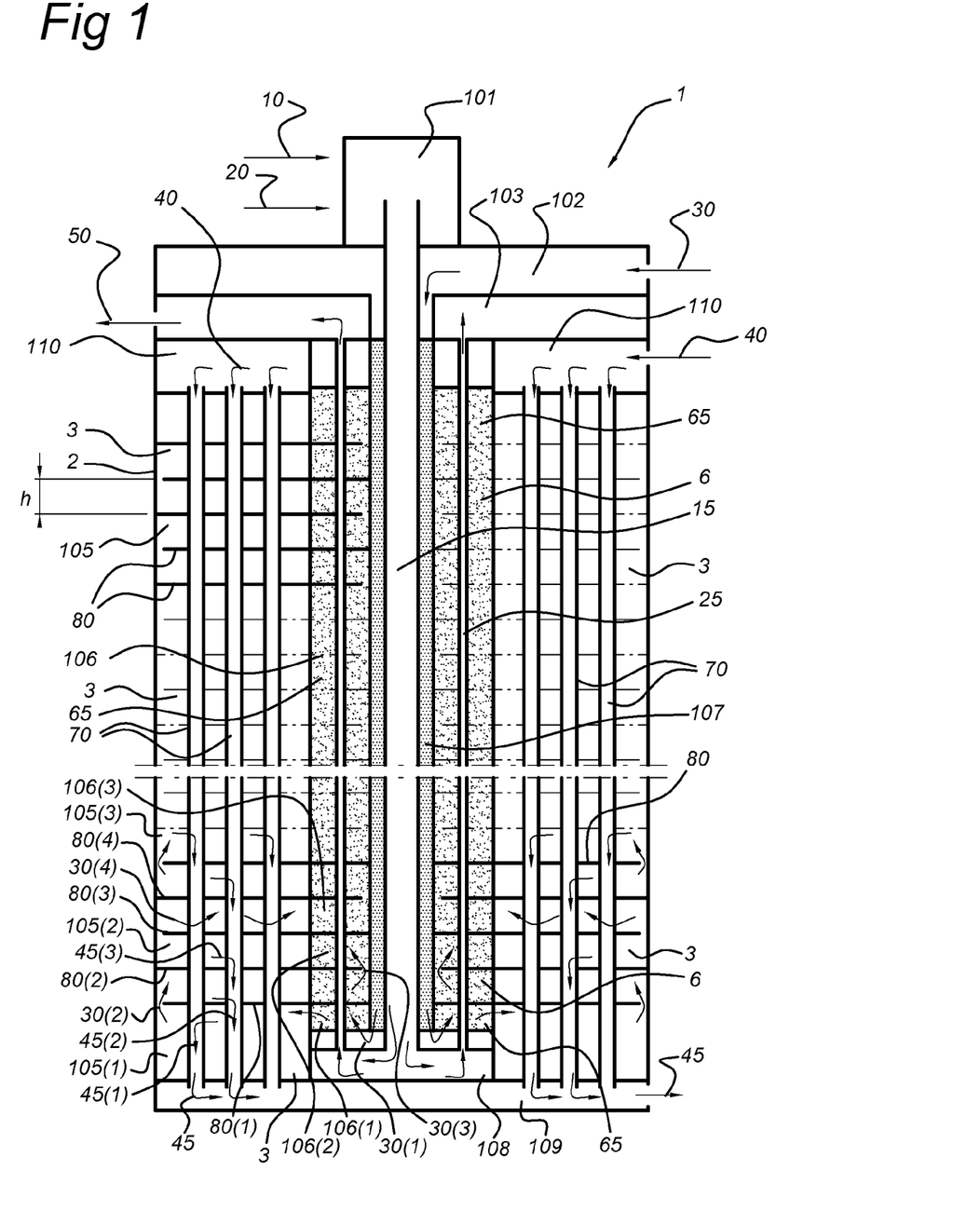
FIG. 1 schematically depicts an embodiment of the reactor according to the invention.

FIG. 1 schematically depicts an embodiment of an integrated catalyst and membrane reactor, further indicated as reactor 1, comprising a gas flow channel 3, wherein the gas flow 3 channel comprises a plurality of alternating catalyst sections 106 and membrane sections 105. Each catalyst section comprises a catalyst bed 6. Each membrane section 105 comprises a plurality of tubular gas membranes 70. The tubular gas membranes 70 (further also indicated as gas membranes 70) are configured in a cross-flow arrangement relative to a gas flow (of a feed gas 30) through the gas flow channel 3. The tubular gas membranes 70 are selectively permeable for a predetermined gaseous species. As will be clear to the person skilled in the art, this drawing is only schematic. For instance, the reactor 1 may comprise many more gas membranes 70 than schematically depicted.

As schematically depicted, a majority of the tubular gas membranes 70 is not in physical contact with the catalyst beds 6 (in this embodiment in face none of the tubular gas membranes 70 is in physical contact with the catalyst beds 6).

The catalyst beds 6 may especially comprise a monolithic catalyst, such as a catalyst suitable for reforming arranged on a monolith. The reactor 1 may especially be suitable for the production of hydrogen, for instance in a steam reforming process.

The reactor 1 in this embodiment further comprises a heating channel 15, which may also be indicated as burner. As schematically depicted, the heating channel 15 is adjacent to the catalyst sections 106. The reactor 1 further comprises a feed channel 107, upstream of the gas flow channel 3, wherein at least part of the feed channel 107 is adjacent to the catalyst sections 106.

As schematically drawn, at least part of the feed channel 107 is in physical contact with the catalyst beds 6. In this embodiment, the feed channel 107 circumferentially surrounds the heating channel 15 over at least part of the total length of the heating channel 15. Hence, the heating channel 15 is in physical contact with the feed channel 107 over at least part of the total length of the heating channel 15. In this embodiment, the catalyst sections 106 and membrane sections 105 are radially arranged around the central heating channel 15, with the catalyst sections 106 arranged between the membrane sections 105 and the heating channel 15.

In this embodiment, adjacent catalyst sections 106 are separated by baffles 80 within the gas flow channel 3. Also, adjacent membrane sections 105 are separated by baffles 80 within the gas flow channel 3. Further, in this embodiment, the catalyst sections 106 are stacked and the membrane sections 105 are stacked. Examples are indicated by stacked catalyst sections 106(1), 106(2) and 106(3) and stacked membrane sections 105(1), 105(2) and 105 (3), respectively. The numbering is only for the sake of understanding.

The schematically depicted configuration also allows a meandering flow through the catalyst sections 106 and the membrane sections 105 of the flow channel 3. Assuming feed gas 30 arriving at the bottom of the feed channel 107, the feed gas indicated with reference 30(1) enters a first catalyst section 106(1). Feed gas 30 flows through the catalyst bed 6 and arrives at a first membrane section 105(1). The feed gas 30 flows beyond a first baffle 80(1) (the feed gas 30 is here indicated with reference 30(2)) and then arrives at the second catalyst section 106(2). Feed gas 30 flows through this second catalyst section 106(2), around a second baffle 80(2) (the feed gas 30 is here indicated with reference 30(3)) and then arrives in a second membrane section 105(2). The feed gas 30 flows around a third baffle 80(3), and travels further as feed gas 30(4) between the third baffle and fourth baffle 80(4), until it reaches a third catalyst section 105(3), in which the feed gas flows around the fourth baffle to a next membrane section 106. This meandering goes on and on.

Preferably, at least 10 times the feed gas 30 is sequentially available in a catalyst section 106 and membrane section 105, respectively. During the gas flow, within the catalyst sections 106, the predetermined gas is formed (especially $H_2$), that may selectively pass the membranes into the interior of the tubular membranes 70. The flow of such gas component is indicated with reference 45. The reactor 1, or more precisely the flow channel 3, accordingly may comprise at least 10 catalyst sections 106, especially at least 15 catalyst sections 106.

Methane, e.g. in the form of natural gas, may enter as fuel 10, for instance via an inlet section 101 (sometimes also indicated as "plenum"), the heating channel 15. Further, oxygen, e.g. in the form of air, may enter as gas 20, also via inlet section 101, the heating channel 15, wherein the fuel is burned to provide heating of the reactor. The heating channel 15 in this embodiment is a central element, surrounded by other elements, such as a feed channel 107, the catalyst sections 106 and the membrane sections 105 (in increasing distance from the heating channel 15), respectively. Here, reactor 1 further comprises a heating exhaust channel 25, which allows exhaust of the burnt fuel gases (sometimes also indicated as flue gas) from the reactor 1. In an embodiment, as depicted here, the heating exhaust channel 25 is at least partially embedded in one or more catalyst sections 106. Exhaust gases are indicated with reference 50. In this schematically depicted embodiment, an intermediate section 108 is provided, downstream of the heating channel 15 and upstream of the heating exhaust channel 25. Note that the heating exhaust channel 25 may thus not only have the function of exhaust but also the function of (further) heating channel. The heating channel may thus primarily heat the feed channel 107 (with for instance a pre-reforming catalyst, see also below) and the heating exhaust channel 25 may primarily heat the catalyst sections 106.

In the schematically depicted embodiment, the reactor 1 further comprises an exhaust section 103, wherein, before a final exhaust from the reactor, the exhaust gases 50 (such as flue gas) may be collected from the heating exhaust channel(s) 25. Preferably, the reactor 1 comprises a plurality of heating exhaust channels 25. In this way, heat may be distributed effectively over the entire catalyst section.

Feed gas 30 enters the reactor 1, for instance via an inlet section 102 and may flow through the feed channel 107 until it reaches the flow channel 3. The feed channel 107 may at least partially contain a catalyst, such as a pre-reforming catalyst. As indicated above, within the flow channel, the feed gas 30 meets catalyst sections 106. At least part of the total number of catalyst sections 106 will contain a catalyst 65, which may for instance be a reforming catalyst.

As indicated above, within the flow channel 3 (or even already within the feed channel 107 when containing a suitable catalyst, such as a pre-reforming catalyst) a predetermined gas is formed, such as $H_2$. To further enable removal of the predetermined gas from the permeate side of the tubular membranes 70, those membranes 70 may be flushed with a sweep gas 40, which may for instance enter the reactor 1 via a sweep gas inlet section 110. The sweep gas is fed to the tubular membranes 70 and leaves the reactor together with the predetermined gas 45. The reactor may further comprise a gas outlet section 109, wherein the gas from the permeate side of the tubular membranes 70 is collected, before it exists the reactor 1.

Figure 2:
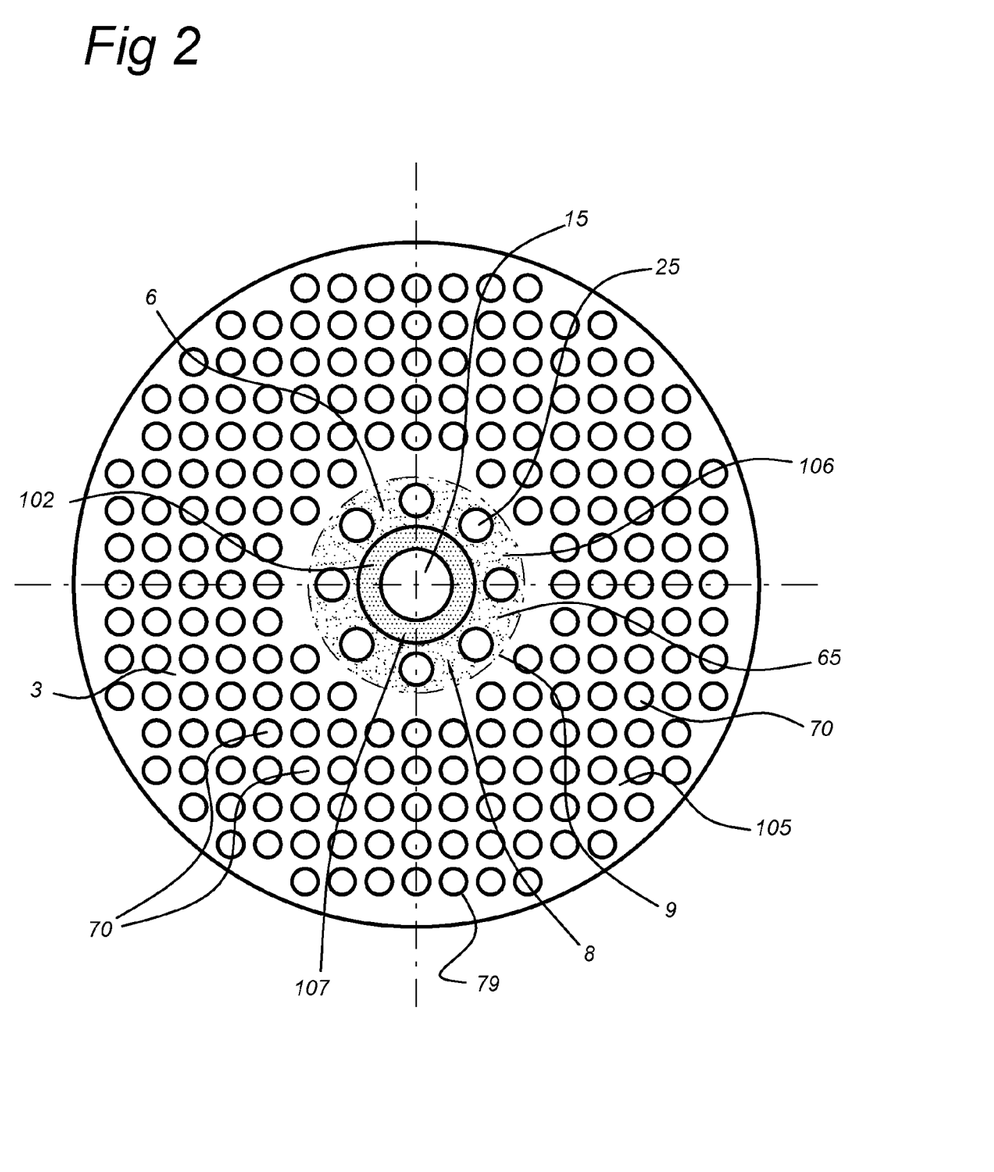
FIG. 2 schematically depicts a cross-section of an embodiment of the schematically depicted embodiment of FIG. 1.

FIG. 2 schematically shows a cross section of part of the reactor 1. A plurality of tubular membranes 70, configured around a central part is shown. The central part or portion is indicated with reference 8. Radially inwards from the membrane section 105, containing (part of) the tubular membranes, the catalyst sections 106 are configured. Again, the catalyst sections 106 contain (part of) the heating exhaust channels 25. Especially, the reactor 1 comprises at least 4, even more especially at least 6 of such heating exhaust channels 25, which may penetrate a stacked configuration of catalyst sections 106. Radially inwards from the catalyst section(s) 106, the feed channel 107 and heating channel 15 are configured, respectively. Hence, a tube-in-tube configuration of the heating channel 15 and feed channel 107 may be present over a substantial part of the length of the reactor 1, wherein the heating channel may form a central channel, at least partly surrounded by the feed channel 107. The accumulated perimeter of the tubular membranes 70 will be larger than the perimeter of the catalyst bed (preferably at least 5 times). The perimeter of a membrane is indicated with reference 79. The perimeter of the catalyst bed 6, here assuming substantially round sections, is indicated with reference 9; it may physically be the outside of a freestanding catalyst bed, or it may be a gauze or permeable or perforated wall.

Figure 3:
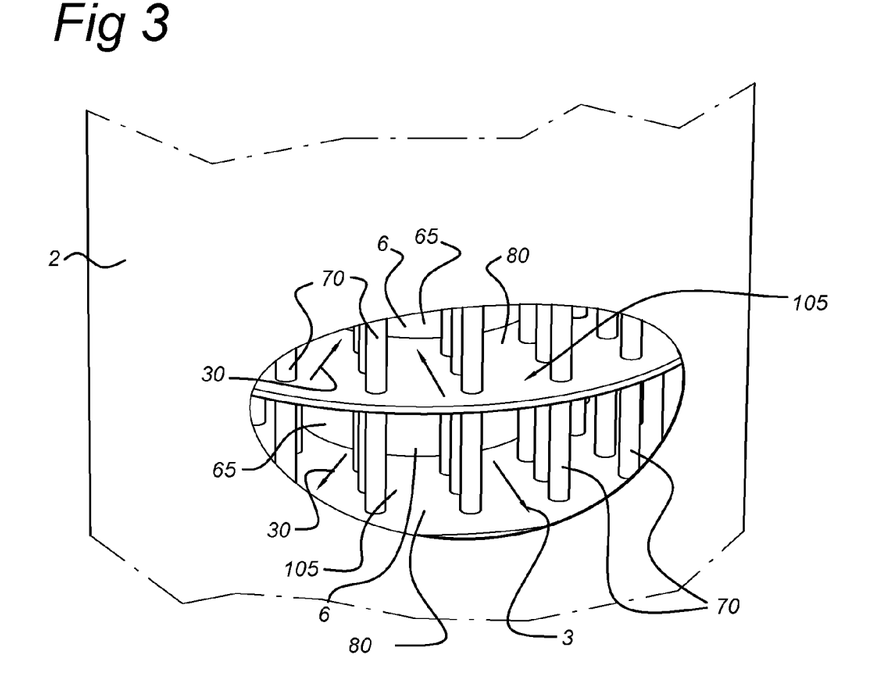
FIG. 3 schematically depicts a through view in a direction from wall to a central part of the reactor as schematically depicted in FIGS. 1 and 2.

FIG. 3 schematically depicts a radially inward view, when seen through the wall 2 of reactor 1. Assuming that the feed gas 30 flows in a direction from the wall 2 to the catalyst 65/catalyst bed 6 (such as in the form of a monolith catalyst), as indicated in the upper part, the gas feed 30 feed meets the catalyst face, penetrates into the bed, escapes downstream from the bed and enters a downstream membrane section 105 (lower part of the figure). This face may be curved, i.e. the catalyst bed may be curved, see also the outer ring of the catalyst sections in FIG. 2. Especially, the interface area of catalyst bed 6 at the interface membrane section—catalyst section is smaller than the surface area of the plurality of membranes comprised by said membrane section.

Baffles will guide the feed flow in cross-flow across a bundle of membrane tubes where the feed flow passes through a catalyst bed with each passage. In FIG. 3, upper baffle 80 continues outward to the outer wall 2 and thus separates upper membrane 105 from lower membrane section 105, while it does not continue inward into (the whole of) the catalyst bed allowing the gas to pass from the higher part to the lower part of the catalyst bed 6 as depicted. The lower baffle, 80 in turn does not continue to the outer wall 2 and allows gas to pass from the lower membrane section 105 to the next lower membrane section (not depicted), while it separates the catalyst bed 65 in this section from the next lower (part of the) catalyst bed (not depicted). In this mode of FIG. 3, the gross gas flow direction in the reactor is downward. However, it will be immediately clear that the gas flow may be inversed, and the gross gas flow direction is upward, as in FIG. 1.

Further, a central burner with a pre-reforming or primary reforming bed between the catalyst and the burner zone to reduce the wall temperature of the external burner tubing may be applied. In addition, a catalyst bed through which the feed gas flows subsequently radially towards the burner, in axial direction and than in an radially in an outward direction passing through zones of different temperatures appears to be advantageous. Further, the use of "rings" or foam or other structured packings which fit between the baffles and surrounding burner pipe appears beneficial.

The membrane reactor allows to achieve a high conversion (above equilibrium) because the hydrogen is removed continuously from the reaction.

A relevant parameter in the design of a membrane reactor may be the hydrogen recovery, which indicates the ratio between the pure hydrogen recovered at the permeate side of the membrane compared to the maximum amount of hydrogen based on the feed composition. The maximum hydrogen recovery which can be reached in an alternatingly integrated system is lower than in a fully integrated system and depends on the number of steps. In our calculations, we have shown that the number of sequential steps is preferably large. For instance, the number of steps required to achieve a high conversion in under industrially relevant conditions (steam/carbon ratio=3, feed pressure=30 bar, hydrogen recovery at 5.5 bar using a nitrogen sweep (ratio $H_2/N_2=3$) with a conversion higher than 70% is already more than 20 under these conditions. As economic feasibility dictates hydrogen recoveries well above 70%, the calculations show that effective solutions for integrating a large number of reaction and separation steps are required.

FIGS. 4a-4d are explained below in the Examples part.

Figure 5A:
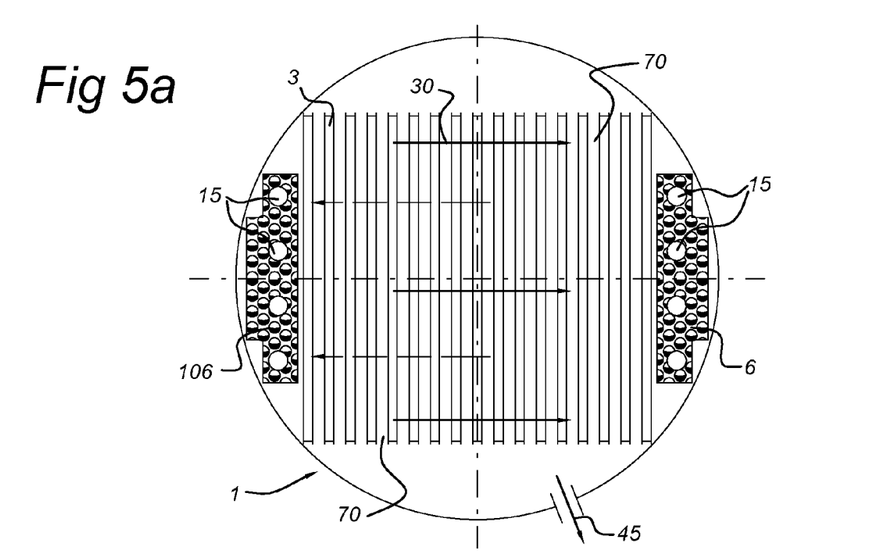
FIGS. 5a-5c schematically depict another embodiment of the reactor.
Figure 5B:
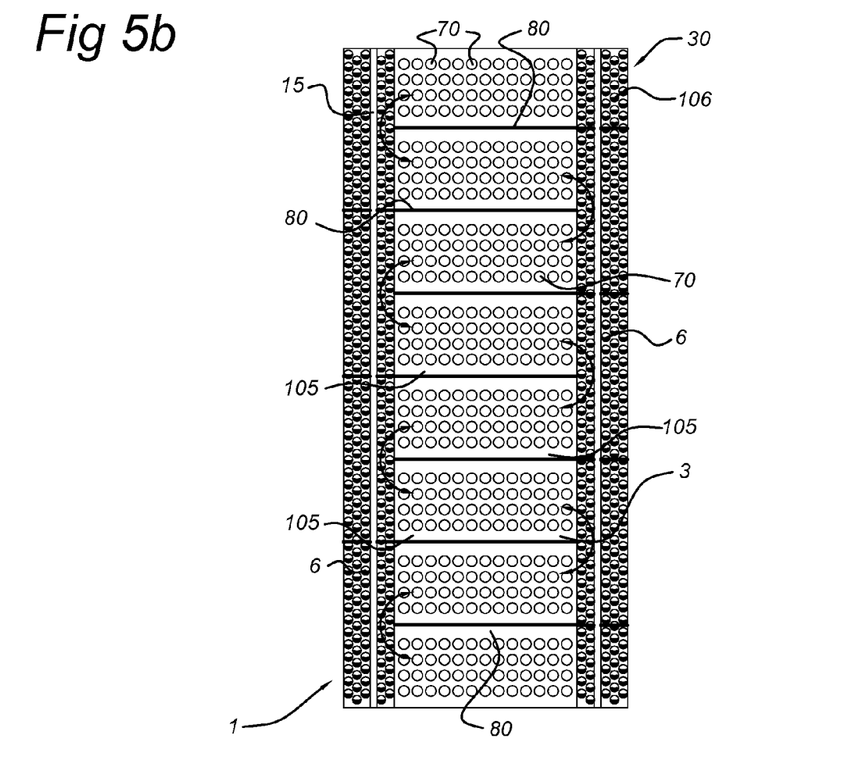
Figure 5C:
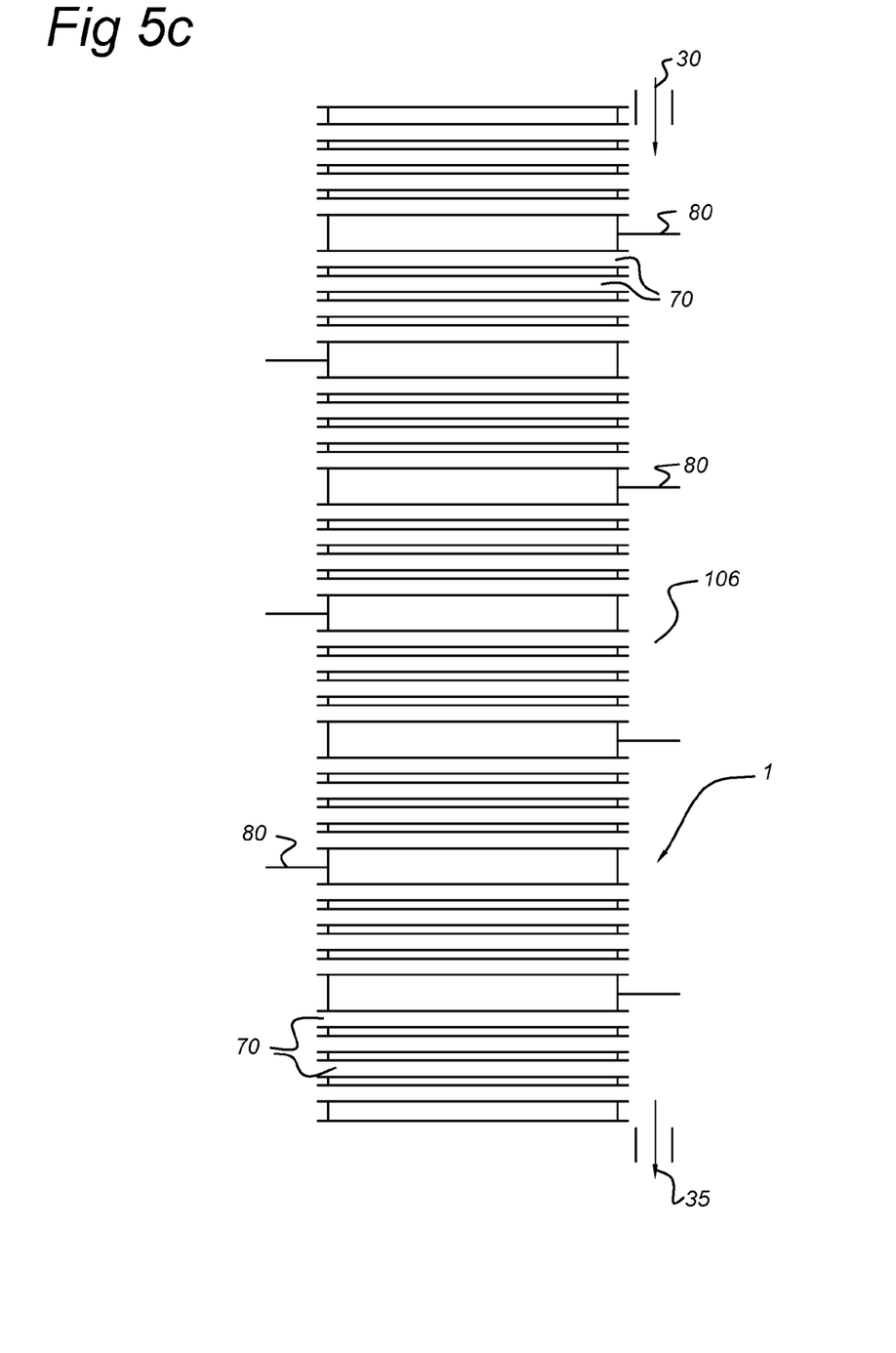

FIGS. 5a-5c schematically depict a further embodiment and variants, wherein the reactor 1 comprises a plurality of tubular gas membranes 70. In this embodiment, the tubular gas membranes 70 are arranged perpendicular to a longitudinal cylinder axis (not depicted), whereas in the embodiments schematically depicted in FIGS. 1-3, the tubular gas membranes 70 are parallel to a longitudinal cylinder axis (not depicted). In this way, layers of pluralities of tubular gas membranes 70 are provided. Baffles 80 in this embodiment separate the (stacked) layers, and the feed gas 30 may again experience a meandering gas flow channel 3. The feed gas alternatingly flows through the catalyst sections 106 and membrane sections 105. Whereas in the embodiments schematically depicted in FIGS. 1-3 the catalyst beds 6 were arranged in the central part of the reactor 1, here the catalyst beds 6 may be arranged at the edge of the reactor 1. One or more heating channels 15 may penetrate through the catalyst beds 6. Here, the baffles 80 may for instance have the form of disks, such as disks having openings, or truncated disks.

FIG. 5a is a cross-sectional view, perpendicular to the longitudinal cylinder axis and FIG. 5b is a cross-sectional view parallel to the longitudinal cylinder axis (and perpendicular to FIG. 5a). FIG. 5c schematically depicts the flow of the feed gas 30, the arrangement of the tubular gas membranes 70, and the gas exit 35.

Hence, the catalyst sections and membrane sections are arranged in a layer-like configuration (here each "layer" by way of example comprises four layers of tubular membranes), with the catalyst sections (and the heating channel) arranged at one or more edges of the membrane sections.

Figure 6:
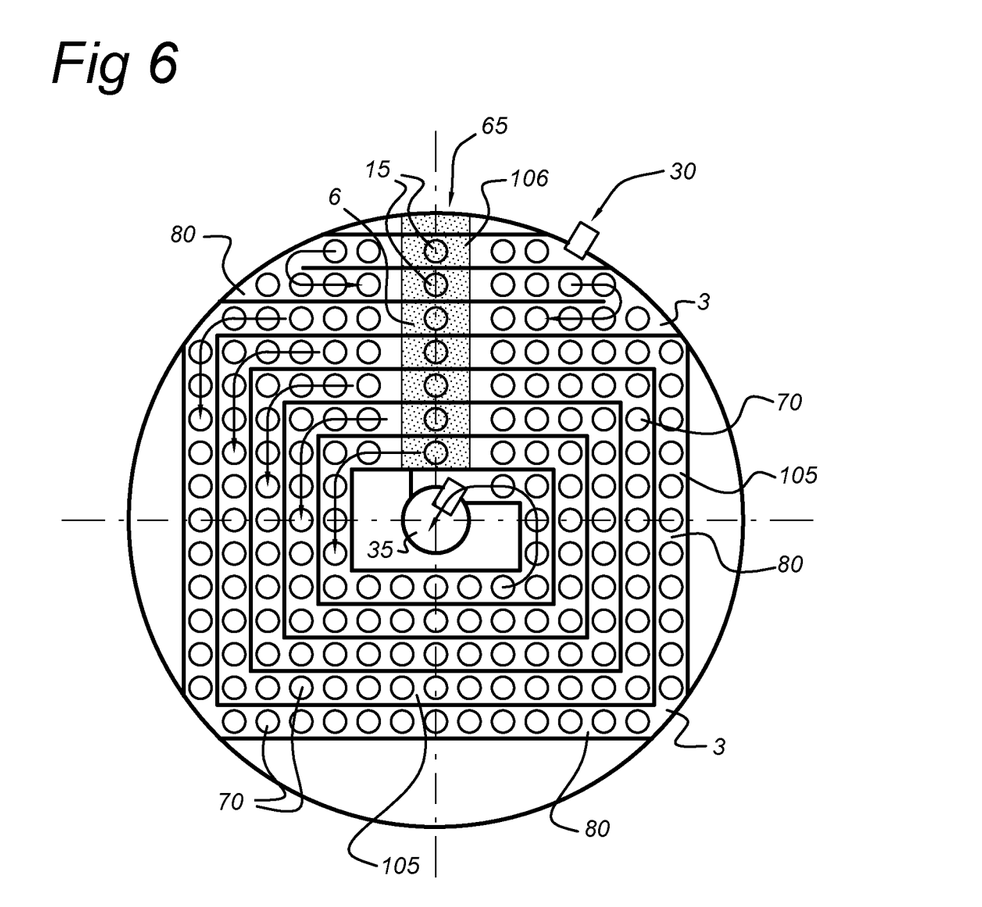
FIG. 6 schematically depict yet another embodiment of the reactor.

FIG. 6 shows a further embodiment. This embodiment is similar to the embodiments schematically depicted in FIGS. 1-3. The tubular gas membranes 70 may be parallel to the longitudinal cylinder axis, but now the baffles are also parallel to the longitudinal cylinder axis. The flow channel is a rectangular spiral, intercepted by catalyst sections 106. Here, by way of example each "circle" (or "passage") is intercepted once. As will be clear to the persons skilled in the art, more interceptions per circle are also possible. Feed gas 30 enters the through an inlet into the first membrane section, 30, while product gas 35, depleted in the predetermined component, leaves at an outlet 35 from the last membrane section.

Hence, the membrane sections may be arranged in a circular way, with the catalyst sections as segments intercepting the membrane sections. Here, the baffles may for instance have the form of internal reactor walls or panels.

As illustrated in FIGS. 1-3 and 5-6, all kinds of configurations are possible. More configurations are conceivable, and the claims are not limited to the schematically depicted embodiments. Here, all schematically depicted embodiments have in common that they show an integrated catalyst and membrane reactor comprising a gas flow channel, wherein the gas flow channel comprises a plurality of alternating catalyst sections and membrane sections, wherein each catalyst section comprises a catalyst bed, wherein each membrane section comprises a plurality of tubular gas membranes, wherein the tubular gas membranes are configured in a cross-flow arrangement relative to a gas flow through the gas flow channel, and wherein the tubular gas membranes are selectively permeable for a predetermined gaseous species. Hereby, compactness may be obtained and heat transfer limitations (by increasing velocities to "engineering values") may be overcome. It may further allow enabling catalyst and membrane to operate at different conditions (operating window).

EXAMPLES

Example 1

Figure 4A:
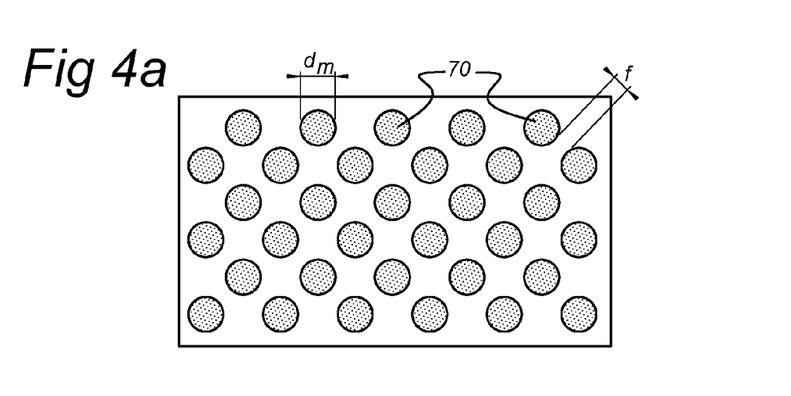
FIG. 4a schematically shows membranes arranged in bundle.

Comparison of Packing Density of Membrane Tubes in the Novel and in a Standard Membrane Reactor Calculated: for a membrane section the membrane cross-sectional area/total cross-sectional area [%] and number of membranes per m². Starting points for novel concept:
  Membrane diameter=$d_m$ (example membranes typical $d_m$=1.4 cm)
  Because of flanges a certain distance between membranes is necessary, and we assume the flange leads to a minimum distance between the membranes f=½ $d_m$ (or 1.4/2 cm)
For a triangular arrangement, as shown in FIG. 4a, the ratio between the membrane area and the total area is equal to 23% corresponding to 1500 membranes/m².

Figure 4B:
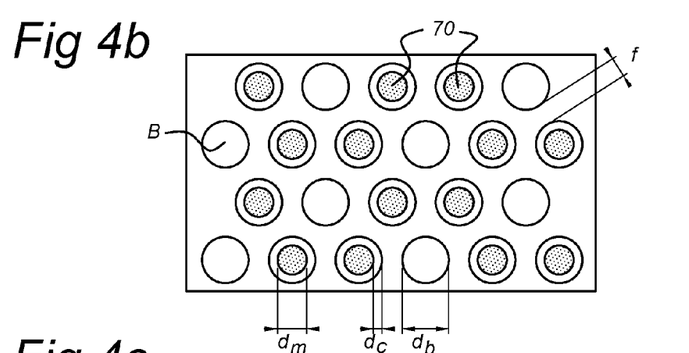
FIG. 4b schematically shows membranes (with catalyst therein) and burner/heater tubes.

In the typical tube-in-tube configuration shown in FIG. 4b (reference example), there are membrane/catalyst tubes and burner or heater tubes. The reference $d_c$ indicates the thickness of the catalyst layer. In this case a typical arrangement is assumed where every burner is surrounded by 6 membranes and correspondingly each membrane is adjacent to 3 burners/heat tubes (indicated with B).
  Membrane diameter=$d_m$ (for our membranes typical $d_m$=1.4 cm)
  The membrane is surrounded by a layer of catalyst with thickness $d_c$ (we assume the minimum catalyst bed thickness $d_c$ corresponds to 5 mm.
  The burner diameter $d_b$ in this example is based on WO 2004/022480 representing one of the most compact burner systems available ($d_b$=2.54 cm). Flange thickness for the burner has been estimated in the same manner (f=½$d_b$)
In a similar manner as above the ratio between the membrane and the total area (6%) and the number of membrane tubes per square meter has been estimated (400 membranes).

If we assume the catalyst and burner in the novel concept make-up 30% of the cross sectional area, for 1000 membrane tubes the area required is 0.9 m² for the new concept where for the most compact design of the tube-in-tube system the cross section of the reactor will be 2.5 m². With the invention a substantially higher compactness can be achieved.

Example 2

Calculation of the Velocity in a Membrane Reactor for the Tube-In-Tube Concept (Based on a Steam Methane Reformer Membrane Reactor: $CH_4 + H_2O \rightarrow 4H_2 | CO_2$)

In a tube-in-tube configuration, the feed flow is determined by hydrogen flux through the membrane. Theoretically, at 100% conversion for every 4 moles of $H_2$ removed by the membrane, 1 mole of methane needs to be supplied. Typically per mole of methane 2-3 moles of steam are supplied.

As a typical example we assume:
Membrane diameter=1.4 cm
Cat bed thickness: 5 mm
Catalyst particle size: 1 mm
Based on an assumed length of catalyst/membrane tube of 6.5 m, the velocity of the gas will be at the feed side inlet will be: 0.2 m/s. For the hydrogen production of 1322 mol/s this will give flux of 553 mol/s. For example, for shorter tubes the velocities will be lower, i.e. if the length of the tube is 3.5 meter the velocity is only 0.02 m/s. As more hydrogen is removed from the mixture along the tube, the velocity at the outlet of the tube will be lower. At the velocities of 1 m/s, the average hydrogen partial pressure drop over catalyst bed is 5 times lower than the $H_2$ partial $\Delta p$ over the membrane and for same hydrogen production the hydrogen flux increases to 853 mol/s.

Hence, it will be difficult to eliminate mass transfer in a tube-in-tube concept.

Example 3

How Many Steps are Required in a Sequential System (Reaction-Separation-Reaction-Separation, etc) to Achieve a High Conversion Again we have considered hydrogen production through the steam methane reaction using a membrane reactor. The following starting points have been used:
  Hydrogen recovery pressure (permeate pressure=5.5 bar). This is close to the economic optimum (cost required for compression⇔membrane area) determined for a typical industrial hydrogen production system;
  The membrane area $A_{men}$=5100 m² for a 100 000 Nm³/h plant. This has again been determined an economic optimum (compromise between investment cost and conversion).
  Operating temperature=650° C. (maximum operating temperature for some of the membranes).
The base case is the fully integrated tube-in-tube system. For these conditions we find a methane conversion equal to 96% and a hydrogen recovery=95%

$$H_{2recov}\% = \frac{H_{2,perm}}{H_{2,perm} + H_{2,ret}} \cdot 100\%$$

Figure 4C:
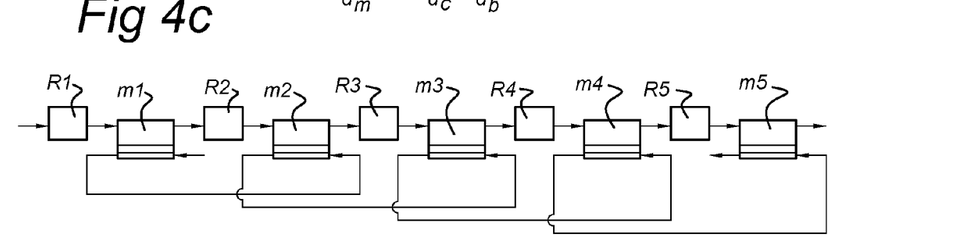
FIG. 4c schematically shows a non-integrated design.

For the non-integrated design (R-S-R-S-R-S- . . . ), see also FIG. 4c, we have calculated the conversion with 5 and 10 steps in both co-current mode and in counter-current mode:

|  | co-flow | | counter-flow | |
| --- | --- | --- | --- | --- |
|  | methane conversion | hydrogen recovery | methane conversion | hydrogen recovery |
| 5 steps | 63.8% | 82% | 64.0% | 99.3% |
| 10 steps | 70.8% | 84% | | |

Figure 4D:
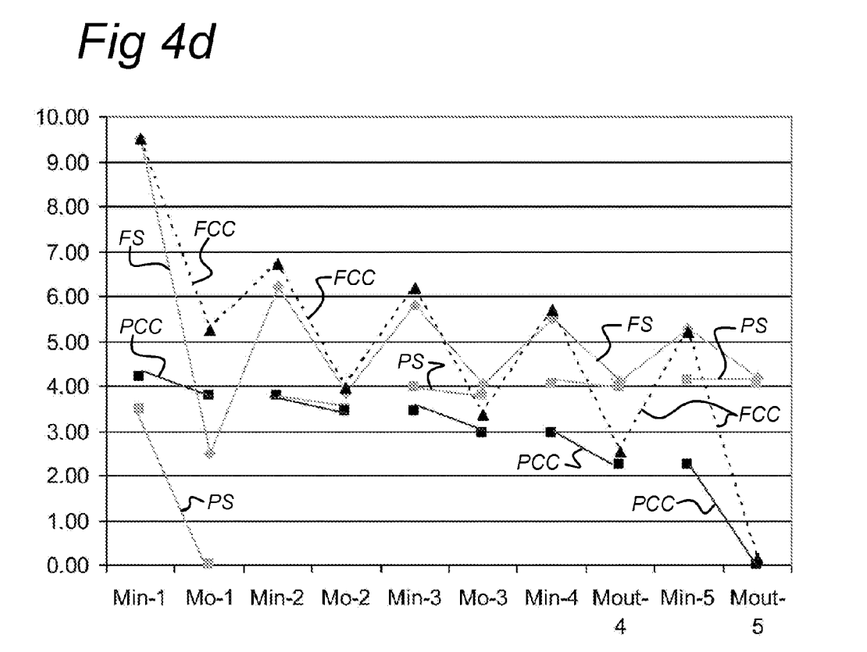
FIG. 4d shows the hydrogen partial pressure at the feed and permeate side (PS) at the entrance (FS, feed side) and exit of each membrane (for 5 sequential reaction and separation steps). Flow scheme is given for co-current flow (Min—membrane inlet, Mo—membrane outlet, numbers are representing step numbers). This figures shows a 5-step counter-flow arrangement with separate reaction/separation steps (RS- . . . RS . . . )

FIG. 4d shows the hydrogen partial pressure at the feed and permeate side at the entrance and exit of each membrane (for 5 sequential reaction and separation steps). The flow scheme is given for co-current flow (Min—membrane inlet, Mo or Mout—membrane outlet, numbers represent step numbers). The zigzag FS (triangles) relates to the feed side in co-flow. The PS lines or line sections (squares) indicate the permeate side in co-flow. The zigzag dotted line FCC (triangles) indicates the counter flow at the feed side; the PCC lines or line sections (squares) indicate the permeate side in counter flow. The triangles indicate the hydrogen ($H_2$) partial pressure at the feed side (where $H_2$ is formed); the squares indicate the $H_2$ pressure at the other side of the membrane, i.e. the permeate side.

When following the reaction, i.e. following the connected lines from left to right, alternatingly there is a reduction in pressure (removal of $H_2$) and an increase in pressure ($H_2$ production). The progress of the reaction is greatly inhibited since the driving force, which is the difference in $H_2$ pressure in feed and permeate, quickly reduces. In case of non-integration for counter-current mode, conversion is insignificantly improved.

Hence, the integrated case gives better conversions than non-integrated at a low number of steps. This problem is solved with the invention, see also below.

Example 4

To calculate the amount of steps required the following table has been calculated.

|  | co-flow |
|---|---|
| 5 steps | 63.8 % |
| 10 steps | 70.8% |
| 15 steps | 73.3% |
| 20 steps | 74.5% |

This basic calculation shows the difficulty of achieving a high conversion with sequential reaction/separation. This problem is solved with the invention, see also below.

Example 5

Why a Higher Temperature for the Reaction is Advantageous for a High Conversion

The operating temperature of the membrane reactor is limited by the lifetime of the membranes. If the temperature becomes too high (>600-650° C.) the lifetime of some membranes may become less sufficient. At the same time a high temperature is advantageous for the chemical reaction: the equilibrium of the reaction $CH_4+H_2O \rightarrow 4H_2+CO_2$ shifts to the right with a higher temperature.

In all membrane reactor concepts in the patent literature, the close integration of catalyst and membranes means they are operated at the same temperature. Our design creates a new degree of freedom in which in principle a temperature difference between membranes and catalyst is possible.

We have made a number of calculations based on the same starting-points used in the previous example but at a higher temperature to illustrate why a higher temperature in the catalyst is advantageous. Hence, the invention solves the problem by enabling higher temperature in the catalyst and providing a large number of steps.

| Methane conversion ||||
|---|---|---|---|
| Temperature (° C.) | 5-steps | 10-steps | Integrated |
| 650 | 64.0% | 70.8% | 96% |
| 700 | 80.77% | 87.75% |  |
| 750 | 93.05% | 96.71% |  |
| 800 | 98.4% | 99.17% |  |

The invention claimed is:

1. An integrated catalyst and membrane reactor comprising: a gas flow channel comprising a plurality of alternating catalyst sections and membrane sections; wherein each catalyst section comprises a catalyst bed and each membrane section comprises a plurality of tubular gas membranes which are selectively permeable for a predetermined gaseous species, wherein the tubular gas membranes are configured in a cross-flow arrangement relative to a gas flow through the gas flow channel.

2. The reactor according to claim 1, wherein a majority of the tubular gas membranes is not in physical contact with the catalyst beds.

3. The reactor according to claim 1, wherein the membrane sections comprise bundles of membranes, in a cross-flow arrangement relative to the gas flow through the membrane sections, and wherein at least 20% of the volume of the membrane sections is occupied by the bundles of tubular membranes.

4. The reactor according to claim 1, wherein the catalyst beds comprise a monolithic catalyst.

5. The reactor according to claim 4, wherein the catalyst is selected from the group consisting of a water gas shift catalyst, a steam reforming catalyst, a $CO_2$ reforming catalyst, a dehydrogenation catalyst, a Fischer-Tropsch catalyst and a partial oxidation catalyst.

6. The reactor according to claim 1, wherein the predetermined gaseous species is hydrogen.

7. The reactor according to claim 1 further comprising a heating channel, wherein the heating channel is adjacent to the catalyst sections, and the heating channel comprises a feed channel, upstream of the gas flow channel, wherein at least part of the feed channel is adjacent to the catalyst sections.

8. The reactor according to claim 7, wherein at least part of the feed channel is in physical contact with the catalyst sections.

9. The reactor according to claim 7, wherein the catalyst comprises a reforming catalyst and wherein at least part of the feed channel comprises a pre-reforming catalyst.

10. The reactor according to claim 7, wherein the heating channel is in physical contact with the feed channel over at least part of the total length of the heating channel.

11. The reactor according to claim 7, wherein the feed channel circumferentially surrounds the heating channel over at least part of the total length of the heating channel.

12. The reactor according to claim 7, wherein adjacent catalyst sections are separated by baffles within the gas flow channel and wherein adjacent membrane sections are separated by baffles within the gas flow channel.

13. The reactor according to claim 1, wherein the catalyst sections are stacked and wherein the membrane sections are stacked.

14. The reactor according to claim 1, wherein the catalyst sections and the membrane sections are arranged to allow a meandering flow through the catalyst sections and the membrane sections of the flow channel.

15. The reactor according to claim 1, wherein the catalyst sections and membrane sections are radially arranged around a central heating channel, with the catalyst sections arranged between the membrane sections and the heating channel.

16. The reactor according to claim 1, wherein the gas flow channel comprises at least 10 catalyst sections.

17. The reactor according to claim 1, wherein the interface area of catalyst bed at the interface membrane section—catalyst section is at least 5 times smaller than the surface area of the plurality of membranes.

18. The reactor according to claim 1, wherein the plurality of tubular membranes penetrate through the plurality of membrane sections.

19. The reactor according to claim 1, wherein the tubular gas membranes extend through the plurality of membrane sections.

20. A method comprising passing a feed gas through a plurality of alternatingly arranged catalyst sections and membrane sections within an integrated catalyst and membrane reactor comprising a gas flow channel, wherein each catalyst section comprises a catalyst bed, wherein each membrane section comprises a plurality of gas membranes, wherein the gas membranes are configured in a cross-flow arrangement relative to a gas flow through the gas flow channel, and wherein the gas membranes are selectively permeable for a predetermined gaseous species.

21. The method according to claim 20, wherein the predetermined gaseous species is hydrogen.

22. The method according to claim 20, wherein the feed gas comprises a saturated hydrocarbon and one or more of $CO_2$, $H_2O$, and $O_2$.

23. The method according to claim 20, wherein the feed comprises methane, and at least one of steam or $CO_2$, and wherein the catalyst comprises a reforming catalyst.

24. A method comprising:
   passing a feed gas through a plurality of alternatingly arranged catalyst sections and membrane sections within a reactor;
   wherein:
      the reactor is an integrated catalyst and membrane reactor comprising:
         a gas flow channel comprising the plurality of alternating catalyst sections and membrane sections;
         wherein:
            the gas membranes are tubular; and
            the tubular gas membranes are configured in a cross-flow arrangement relative to a gas flow through the gas flow channel;
      each catalyst section comprises a catalyst bed;
      each membrane section comprises a plurality of gas membranes;
      the gas membranes are selectively permeable for a predetermined gaseous species.

\* \* \* \* \*